(12) United States Patent
Ehlert et al.

(10) Patent No.: US 11,064,170 B2
(45) Date of Patent: Jul. 13, 2021

(54) LASER PROJECTION DEVICE, METHOD FOR ITS OPERATION, AND LASER PROJECTOR

(71) Applicant: Robert Bosch GmbH, Stuttgart (DE)

(72) Inventors: Alexander Ehlert, Reutlingen (DE); Christoph Puttmann, Kusterdingen (DE); Christoph Delfs, Bretten (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/763,357

(22) PCT Filed: Sep. 27, 2018

(86) PCT No.: PCT/EP2018/076374
§ 371 (c)(1),
(2) Date: May 12, 2020

(87) PCT Pub. No.: WO2019/101405
PCT Pub. Date: May 31, 2019

(65) Prior Publication Data
US 2020/0296338 A1 Sep. 17, 2020

(30) Foreign Application Priority Data
Nov. 22, 2017 (DE) .......................... 102017220810.4

(51) Int. Cl.
*H04N 9/31* (2006.01)
*G02B 26/10* (2006.01)

(52) U.S. Cl.
CPC ......... *H04N 9/3155* (2013.01); *H04N 9/3135* (2013.01); *H04N 9/3161* (2013.01); *H04N 9/3194* (2013.01); *G02B 26/101* (2013.01)

(58) Field of Classification Search
CPC ... H04N 9/3161; H04N 9/3135; H04N 9/3155
See application file for complete search history.

(56) References Cited

U.S. PATENT DOCUMENTS 10,444,608 B2 * 10/2019 Xu ....................... H01S 5/06825
10,444,609 B2 * 10/2019 Xu ....................... H04N 9/3161
10,444,610 B2 * 10/2019 Xu ....................... H04N 9/3155
(Continued)

FOREIGN PATENT DOCUMENTS

WO 0115289 A2 3/2001

OTHER PUBLICATIONS

International Search Report for PCT/EP2018/076374, dated Jan. 7, 2019.

*Primary Examiner* — Paulos M Natnael
(74) *Attorney, Agent, or Firm* — Norton Rose Fulbright Us LLP; Gerard Messina (57) ABSTRACT

A laser projection device, including at least one laser diode for generating at least one laser beam. The laser projection device includes at least one laser driver for operating the at least one laser diode; at least one image processing circuit to supply control data for the at least one laser driver; at least one central processor and/or driver; and at least one control and/or regulating unit, which is configured to block the at least one laser driver in response to an occurrence of at least one fault. The at least one control and/or regulating unit includes at least one nonvolatile memory, in which at least a minimum set of monitoring functions is stored.

10 Claims, 3 Drawing Sheets

(56) References Cited

U.S. PATENT DOCUMENTS

| | | | |
|---|---|---|---|
| 2005/0210179 A1* | 9/2005 | Walmsley | B41J 2/04505 |
| | | | 711/3 |
| 2006/0291510 A1* | 12/2006 | Juluri | H01S 5/0683 |
| | | | 372/29.021 |
| 2008/0123708 A1* | 5/2008 | Benner | H04N 9/3129 |
| | | | 372/38.09 |
| 2017/0114992 A1* | 4/2017 | Dodworth | F21V 21/15 |

* cited by examiner

LASER PROJECTION DEVICE, METHOD FOR ITS OPERATION, AND LASER PROJECTOR

BACKGROUND INFORMATION

A conventional laser projection device may include at least one laser diode for generating at least one laser beam, at least one laser driver for operating the at least one laser diode, at least one image processing circuit to supply control data for the at least one laser driver, at least one central processor and/or driver, and at least one control and/or regulating unit, which is configured to block the at least one laser driver in response to an occurrence of at least one fault.

SUMMARY

The present invention is directed to a laser projection device, including at least one laser diode for generating at least one laser beam; at least one laser driver for operating the at least one laser diode; at least one image processing circuit to supply control data for the at least one laser driver; at least one central processor and/or driver; and at least one control and/or regulating unit, which is configured to block the at least one laser driver in response to an occurrence of at least one fault.

In accordance with the present invention, it is provided that the at least one control and/or regulating unit includes at least one nonvolatile memory, in which at least a minimum set of monitoring functions is stored.

The laser driver may preferably take the form of an electrical circuit, particularly preferably, an integrated circuit. The laser driver includes, in particular, at least one storage unit and an operating program stored in the storage unit, and is preferably configured to operate a laser, in particular, a laser diode, with the aid of the operating program. In particular, the laser driver is configured to process an electrical voltage provided by a power supply unit of the laser projection device, for example, a power pack or a storage battery, and/or an electrical current supplied by the power supply unit of the laser projection device, in such a manner, that the laser diode may be operated. Preferably, the laser driver may smooth and/or modulate an electrical voltage provided by the power supply unit and/or limit an electrical current supplied to the laser diode. In particular, "configured" is to be understood as specially programmed, designed and/or equipped. That an object is configured for a particular function, is to be understood to mean, in particular, that the object fulfills and/or executes this particular function in at least one application state and/or operating state. The laser driver is preferably configured to operate different laser diodes, which emit electromagnetic radiation in different spectral ranges of an electromagnetic frequency spectrum. It is particularly preferable for the laser driver to be configured to operate exactly three different laser diodes; a first of the three laser diodes emitting in a red spectral range of the electromagnetic frequency spectrum, a second of the three laser diodes emitting in a green spectral range of the electromagnetic frequency spectrum, and a third of the three laser diodes emitting in a blue spectral range of the electromagnetic spectrum. The image processing circuit includes, in particular, at least one input, at least one output, and at least one image processor. The image processing circuit is preferably configured to receive image signals of a signal source, in particular, of a DVD or a USB device, in particular, via the input; to process them, in particular, with the aid of an image processor; and to provide them, in particular, via the output, to the laser driver as control data.

The central processor is, in particular, a central processing unit of the laser projection device, which is configured to monitor, control and/or regulate basic functions of the laser projection device. A "processing unit" is to be understood as, in particular, a unit including an information input, information processing, and an information output. The processing unit advantageously includes at least one processor, a storage device, input and output devices, further electrical components, an operating program, regulating routines, control routines, and/or computation routines. The components of the processing unit are preferably situated on a common board and/or advantageously situated in a common housing. The driver may preferably take the form of an electrical circuit, particularly preferably, an integrated circuit. The driver preferably includes a storage unit having an operating program for operating the laser projection device; the operating program being stored in the storage unit. In particular, the driver is configured to monitor, control and/or regulate basic functions of the laser projection device. The laser projection device preferably includes the central processor and the driver. Particularly preferably, the driver takes the form of a part of the central processor. Alternatively, it is possible for the laser projection device to include either the central processor or the driver.

A "control and/or regulating unit" is to be understood as, in particular, a unit having at least one piece of control electronics. "Control electronics" are to be understood as, in particular, a unit including a processor unit and a storage unit, as well as an operating program stored in the storage unit. The control and/or regulating unit is preferably configured to block the at least one laser driver in response to an occurrence of at least one fault. In particular, a defect of a component of the laser projection device, overheating of a component, excessively increased power consumption of a component, or another problem of the laser projection device appearing meaningful to one skilled in the art, may constitute a fault. The control and/or regulating unit preferably includes a nonvolatile memory. That a memory is "nonvolatile," is to be understood to mean, in particular, that data stored in the memory remain stored in the memory in the event of an interruption in the supply of power to the memory. "Monitoring functions" are to be understood as, in particular, safety-related functions of the laser projection device, which are monitored to ensure operational safety of the laser projection device. The monitoring functions may include, in particular, an optical output power of the laser diode, movements of reflector elements of the laser projection device, the supply of power to the laser projection device, and further safety-related functions of the laser projection device appearing useful to one skilled in the art.

The example embodiment of the laser projection device according to the present invention may allow monitoring functions to be stored in an advantageous manner. The laser driver may advantageously be blocked in response to a fault in at least one of the monitoring functions. It may be advantageously ensured that a user and/or observer of the laser projection device does not sustain bodily injury. A laser projection device safe for a user may be advantageously provided.

Furthermore, it is provided that the central processor and/or the driver have neither write-access, nor read-access to the at least one nonvolatile memory. Preferably, the nonvolatile memory is protected against write-access and/or read-access of the central processor and/or the driver. In particular, the central processor and/or the driver and the nonvolatile memory are not physically connected. In addition, the control and/or regulating unit preferably includes at least one memory management unit, which is integrated, in particular, in the processor unit of the control and/or regulating unit. The memory management unit is preferably configured to administer access to the nonvolatile memory. In particular, the memory management unit is configured to reject requests by the central processor and/or the driver for write-access and/or read-access to the nonvolatile memory. In particular, the nonvolatile memory is protected against write-access or read-access of any unit of the laser projection device, which is able to be influenced by the user. In particular, the memory management unit is configured to reject requests for write-access and/or read-access to the nonvolatile memory. The contents of the nonvolatile memory are preferably unalterable by a user. It is preferable for only a manufacturer of the laser projection device to have read-access and/or write-access to the nonvolatile memory. In particular, the memory management unit is configured to allow the manufacturer of the laser projection device write-access and/or read-access to the nonvolatile memory. In particular, during manufacturing of the laser projection device, a minimum set of monitoring functions appearing useful to the manufacturer may be stored in the nonvolatile memory. The minimum set of monitoring functions may advantageously be retained and may remain unchanged over a full service life of the laser projection device. The monitoring functions appearing useful to the manufacturer may be monitored in an advantageous manner.

In addition, it is provided that the at least one control and/or regulating unit include at least one setpoint value register, and that at the start of operation of the laser projection device, the at least one control and/or regulating unit be configured to copy the at least one minimum set of monitoring functions from the at least one nonvolatile memory to the at least one setpoint value register. Preferably, each time the operation of the laser projection device is started, the control and/or regulating unit is configured to copy the minimum set of monitoring functions from the nonvolatile memory to the setpoint value register. In particular, a "register" is to be understood as a storage area of the control and/or regulating unit. The storage area is preferably situated within the processor unit of the control and/or regulating unit and is connected to a processor of the processor unit of the control and/or regulating unit. At the start of operation of the laser projection device, the control and/or regulating unit is preferably configured to copy the minimum set of monitoring functions from the nonvolatile memory to the setpoint value register. In particular, after a copying operation, the setpoint value register has the same contents as the nonvolatile memory. Preferably, the central processor and/or the driver may only have read-access to the setpoint value register. In particular, the setpoint value register is protected against write-access of the central processor and/or the driver. It is advantageous that the minimum set of monitoring functions may be rendered readable, but unalterable.

In addition, it is provided that the at least one control and/or regulating unit include at least one actual value register and at least one laser activation register, and that the at least one control and/or regulating unit be configured to set the at least one laser activation register and to simultaneously enable an output of the at least one image processing circuit, if the contents of the at least one actual value register correspond to at least the contents of the at least one setpoint value register. It is preferable for the central processor and/or the driver to be able to have only write-access to the actual value register. The currently monitored functions of the laser projection device are preferably stored in the actual value register. The control and/or regulating unit is preferably configured to check if all of the monitoring functions of the minimum set of monitoring functions are stored in the actual value register. If all of the monitoring functions of the minimum set of monitoring functions are stored in the actual value register, this means, in particular, that all of the functions classified as safety-related by the manufacturer are currently being monitored. Preferably, further functions, which are currently being monitored and are not included in the minimum set of monitoring functions, may be stored in the actual value register. If all of the monitoring functions of the minimum set of monitoring functions are currently being monitored, then the control and/or regulating unit is preferably configured to set the laser activation register and to enable the image processing circuit. The control and/or regulating unit preferably transmits an enabling signal to the laser activation register and to the output of the image processing circuit.

If the output of the image processing circuit is blocked, the image processing circuit supplies, in particular, the control data for a black level to the laser driver. In the case of an RGB signal, the control data for the black level are made up of, in particular, the value 0 for the red channel, the value 0 for the green channel, and the value 0 for the blue channel. Even when the laser driver is unlocked, the laser driver deactivates the laser diode on the basis of the control data for the black level. In the case of an enabled output of the image processing circuit, the image processing circuit preferably supplies control data different from the black level to the laser driver. A check of the functions currently being monitored may advantageously be carried out.

In addition, it is provided that setting the at least one laser activation register unlocks the at least one laser driver. In particular, the laser driver is blocked in the case of a laser activation register that is not set. The laser diode may preferably be activated in response to an unlocked laser driver, if the output of the image processing circuit is simultaneously enabled and the image processing circuit supplies control data different from the black level to the laser driver. It is advantageous that the laser diode may only be activated in response to simultaneous unlocking of the laser driver and the image processing circuit.

In addition, it is provided that the at least one control and/or regulating unit include at least one protocol register, and that in response to the occurrence of at least one fault in at least one of the monitoring functions, and/or if the contents of the at least one actual value register do not correspond to at least the contents of the at least one setpoint value register, the at least one control and/or regulating unit be configured to reset the at least one laser activation register, to simultaneously block the output of the at least one image processing circuit, and to indicate the at least one fault in a bit of the at least one protocol register. If the contents of the actual value register do not correspond to at least the contents of the setpoint value register, this means, in particular, that at the most, a portion of the monitoring functions of the minimum set of monitoring functions are currently being monitored. In particular, the control and/or regulating unit is configured to reset the laser activation register, even if no fault is present, when the contents of the actual value register do not correspond to at least the contents of the setpoint value register. In particular, if a fault is present, the control and/or regulating unit is configured to reset the laser activation register, to simultaneously block the output of the image processing circuit, and to indicate the fault in a bit of the protocol register, even if the contents of the actual value register correspond to at least the contents of the setpoint value register. The control and/or regulating unit preferably transmits a blocking signal to the laser activation register and to the output of the image processing circuit. Due to the blocking of the output of the image processing circuit, the image processing circuit is preferably compelled to output the control data for the black level. It is preferable for the laser activation register to only be able to be set again, when the fault is eliminated and the protocol register is reset. It is advantageous that the user safety of the later projection device may be increased further.

In addition, it is provided that the resetting of the at least one laser activation register blocks the at least one laser driver. In particular, the laser diode is deactivated in response to the blocking of the laser driver, even if the output of the image processing circuit is enabled and the image processing circuit supplies control data different from the black level to the laser driver. The blocking of the laser driver and the blocking of the output of the image processing circuit are advantageously redundant.

In addition, it is provided that the at least one control and/or regulating unit include at least one operating mode register, and that the at least one control and/or regulating unit be configured to mask the at least one actual value register with the contents of the at least one operating mode register. In particular, application-specific and/or operating-mode-specific sets of functions may be stored in the operating mode register. The application-specific and/or operating-mode-specific sets of functions preferably include non-safety-related functions. "Masking the actual value register with the contents of the operating mode register" is to be understood to mean, in particular, that the contents of the operating mode register, in particular, the application-specific and/or operating-mode-specific sets of monitoring functions, are copied to the actual value register. Apart from the safety-related functions, it is advantageous that further functions of the laser projection device may be monitored.

In addition, it is provided that the at least one control and/or regulating unit have at least one interrupt register, and that in response to an occurrence of at least one event, which corresponds to at least the contents of the at least one interrupt register, the at least one control and/or regulating unit be configured to initiate an interrupt and to transmit the interrupt via an interrupt line to the central processor and/or the driver. In principle, the contents of the interrupt register may be set freely. In particular, a copy of the contents of the actual value register is typically stored in the interrupt register. An "interrupt" is to be understood as, in particular, an interruption, in particular, a temporary interruption, of a running program, in particular, in order to process a further operation. In particular, in response to the initiation of an interrupt, the operation of the laser projection device may be temporarily stopped, in particular, in order to transmit the interrupt via the interrupt line to the central processor and/or the driver. An "interrupt line" is to be understood as, in particular, an electrical data line, which is set up, preferably, for transmitting interrupts, particularly preferably, for transmitting interrupts exclusively. It is preferable for the central processor and/or the driver to be able to register a fault in light of the interrupt. Based on the recording of the fault, the central processor and/or the driver may advantageously process the fault, for example, restart the laser projection device or output a fault indication. A fault of the laser projection device may be responded to in an advantageous manner.

Furthermore, the present invention is directed to a method for operating a laser projection device of the present invention; the laser projection device including at least one laser diode for generating at least one laser beam; at least one laser driver for operating the at least one laser diode; at least one image processing circuit to supply control data for the at least one laser driver; at least one central processor and/or driver; and at least one control and/or regulating unit, which is configured to block the at least one laser driver in response to an occurrence of at least one fault.

In an example method according to the present invention, it is provided that in at least one method step, a minimum set of monitoring functions stored in a nonvolatile memory be copied to at least one setpoint value register at a start of operation of the laser projection device. It is advantageous that the minimum set of monitoring functions may be rendered readable, but unalterable.

Furthermore, the present invention is directed to a laser projector having at least one laser projection device according to the present invention; the laser projection device including at least one laser diode for generating at least one laser beam; at least one laser driver for operating the at least one laser diode; at least one image processing circuit to supply control data for the at least one laser driver; at least one central processor and/or driver; and at least one control and/or regulating unit, which is configured to block the at least one laser driver in response to an occurrence of at least one fault. The laser projector preferably includes further components necessary for operating the laser projector. In particular, the laser projector may include at least one power supply, at least one data input, at least one housing, as well as further components appearing useful to one skilled in the art. It is advantageous that an operationally reliable laser projector may be provided.

In this connection, the laser projection device of the present invention, the method of the present invention and/or the laser projector of the present invention shall not be limited to the use and specific embodiment described above. In particular, in order to achieve a functionality described here, the laser projection device of the present invention, the method of the present invention and/or the laser projector of the present invention may have a number of individual elements, component parts and units, as well as method steps, different from a number mentioned here. In addition, in the ranges of values indicated in this description, values lying within the above-mentioned limits are also to be acknowledged as described and as applicable as desired.

BRIEF DESCRIPTION OF THE DRAWINGS

Further advantages of the present invention may be derived from the description of the figures below. An exemplary embodiment of the present invention is depicted in the figures. The figures and the description include numerous features in combination. One skilled in the art will necessarily consider the features individually, as well, and unite them to form useful, further combinations.

DETAILED DESCRIPTION OF EXAMPLE EMBODIMENTS

Figure 1:
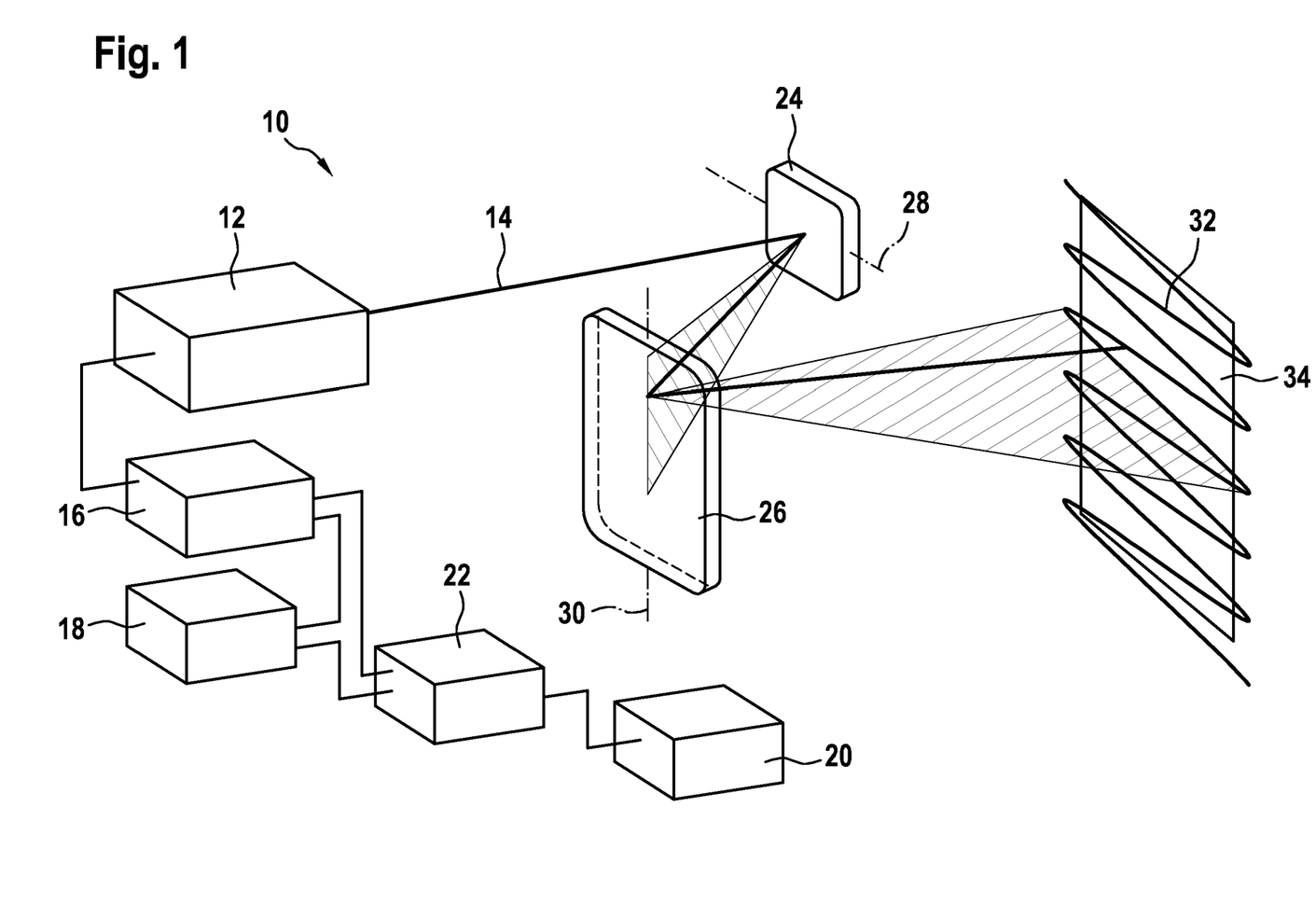
FIG. 1 shows a schematic representation of an example laser projection device according to the present invention.

FIG. 1 shows a schematic representation of an example laser projection device 10 according to the present invention. Laser projection device 10 includes a laser diode 12 for generating a laser beam 14, a laser driver 16, an image processing circuit 18, a central processor and/or driver 20, and a control and/or regulating unit 22. Laser driver 16 takes the form of an integrated circuit. To operate laser diode 12, laser driver 16 is connected to laser diode 12. Image processing circuit 18 is connected to laser driver 16, in order to supply control data for laser driver 16. Control and/or regulating unit 22 is connected to central processor and/or driver 20, to laser driver 16, and to image processing circuit 18.

In addition, laser projection device 10 includes a first reflector element 24 and a second reflector element 26. First reflector element 24 takes the form of a vertical mirror and is supported so as to be movable about a first axis of rotation 28. Second reflector element 26 takes the form of a horizontal mirror and is supported so as to be movable about a second axis of rotation 30. First axis of rotation 28 and second axis of rotation 30 are oriented substantially perpendicularly to each other. In this case, the expression "substantially perpendicularly" shall define, in particular, an orientation of first axis of rotation 28 relative to second axis of rotation 30; in particular, viewed in a plane, first axis of rotation 28 and second axis of rotation 30 forming an angle of 90°, and the angle having a maximum deviation of, in particular, less than 8°, advantageously, less than 5°, and particularly advantageously, less than 2°.

First reflector element 24 is configured to deflect laser beam 14 in a vertical direction. In this case, a "vertical direction" is to be understood as, in particular, a direction at least substantially perpendicular to first axis of rotation 28. Second reflector element 26 is configured to deflect the laser beam 14 deflected by first reflector element 24, in a horizontal direction. In order to clearly represent the functionality of second reflector element 26, second reflector element 26 is depicted semitransparently. In this case, a "horizontal direction" is to be understood as, in particular, a direction at least substantially perpendicular to second axis of rotation 30. Using the laser beam 14 deflected by the two reflector elements 24, 26, laser projection device 10 projects an image 32 onto a projection surface 34.

On their upper surfaces, the two reflector elements 24, 26 each include a coating that reflects electromagnetic radiation. The reflective coating is made of gold. Alternatively, the reflective coating may also be made of silver, silicon, or another material, which reflects electromagnetic radiation and appears useful to one skilled in the art. The upper surfaces of the two reflector elements 24, 26 are each mirror-finished for a high reflectance.

Figure 2:
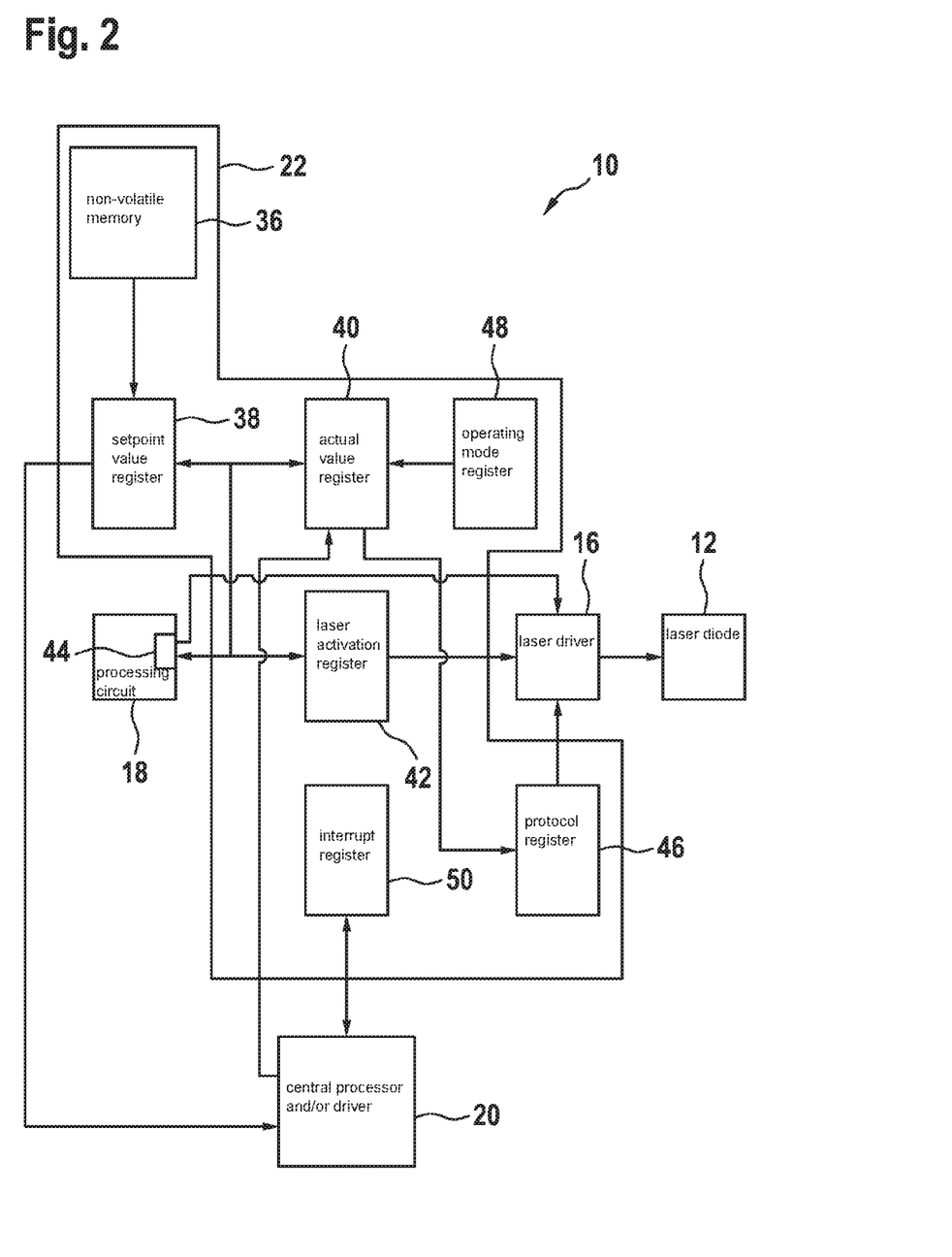
FIG. 2 shows a block diagram of the example laser projection device according to the present invention.

FIG. 2 shows a block diagram of the example laser projection device 10 according to the present invention. Laser projection device 10 includes laser diode 12, laser driver 16, image processing circuit 18, central processor and/or driver 20, and control and/or regulating unit 22. For the sake of clarity, the two reflector elements 24, 26 are not shown.

Control and/or regulating unit 22 includes a nonvolatile memory 36. A minimum set of monitoring functions is stored in nonvolatile memory 36. Nonvolatile memory 36 is protected against access. Control and/or regulating unit 22 includes a memory management unit, which is configured to reject requests by central processor and/or driver 20 for write-access and/or read-access to nonvolatile memory 36. Central processor and/or driver 20 have neither write-access, nor read-access to nonvolatile memory 36.

Control and/or regulating unit 22 further includes a setpoint value register 38. Central processor and/or driver 20 only have read-access to setpoint value register 38. In response to a start of operation of laser projection device 10, control and/or regulating unit 22 is configured to copy the minimum set of monitoring functions from nonvolatile memory 36 to setpoint value register 38. After a copying operation, the contents of setpoint value register 38 correspond to the contents of nonvolatile memory 36.

In addition, control and/or regulating unit 22 includes an actual value register 40. Central processor and/or driver 20 may only have read-access to actual value register 40. In actual value register 40, central processor and/or driver 20 may store a set of functions to be currently monitored. Control and/or regulating unit 22 further includes a laser activation register 42. Control and/or regulating unit 22 is configured to compare the contents of actual value register 40 to the contents of setpoint value register 38. Control and/or regulating unit 22 is configured to set laser activation register 42 and to simultaneously enable an output 44 of image processing circuit 18, if the contents of actual value register 40 correspond to at least the contents of setpoint value register 38. Control and/or regulating unit 22 transmits an enabling signal to laser activation register 42 and to output 44 of image processing circuit 18.

Enabling the output 44 of image processing circuit 18 allows image processing circuit 18 to provide control data different from a black level for laser driver 16. Setting the laser activation register 42 unlocks laser driver 16. Unlocked laser driver 16 may activate laser diode 12 and operate laser diode 12, using the control data of image processing circuit 18.

In addition, control and/or regulating unit 22 includes a protocol register 46. In response to an occurrence of a fault in at least one of the monitoring functions, and/or if the contents of actual value register 40 do not correspond to at least the contents of setpoint value register 38, control and/or regulating unit 22 is configured to reset laser activation register 42, to simultaneously block output 44 of image processing circuit 18 and to indicate the fault in a bit of protocol register 46. Control and/or regulating unit 22 transmits a blocking signal to laser activation register 42 and to output 44 of image processing circuit 18. Laser activation register 42 may only be set again, if the fault is no longer present and protocol register 46 is reset.

Blocking of the output 44 of image processing circuit 18 forces image processing circuit 18 to provide the control data for the black level to laser driver 16. A reset of laser activation register 42 blocks laser driver 16. Both the blocking of output 44 of image processing circuit 18 and the resetting of laser activation register 42 deactivate laser diode 12.

Control and/or regulation unit 22 further includes an operating mode register 48. Application-specific and/or operating-mode-specific sets of functions to be monitored are stored in operating mode register 48. The application-specific and/or operating-mode-specific sets include non-safety-related functions. Control and/or regulating unit 22 is configured to mask actual value register 40 with the contents of operating mode register 48. That is, control and/or regulating unit 22 is configured to copy the contents of operating mode register 48 to actual value register 40.

Furthermore, control and/or regulating unit 22 includes an interrupt register 50. The contents of interrupt register 50 may be set freely by central processor and/or driver 20. In response to an occurrence of an event, which corresponds to at least the contents of interrupt register 50, control and/or regulating unit 22 is configured to initiate an interrupt and to transmit the interrupt through an interrupt line to central processor and/or driver 20. In light of the interrupt, central processor and/or driver 20 may register a fault and perform appropriate measures, such as a restart of laser projection device 10 or the outputting of a fault indication.

An example method for operating laser projection device 10 in accordance with the present invention is described below. In at least one method step, the minimum set of monitoring functions stored in nonvolatile memory 36 is copied to setpoint value register 38 at the start of operation of laser projection device 10. Regarding further method steps of the method for operating laser projection device 10, reference may be made to the above description of laser projection device 10, since this description is to be read analogously on the method, as well, and therefore, all of the features regarding laser projection device 10 are also acknowledged as described with regard to the method for operating laser projection device 10.

Figure 3:
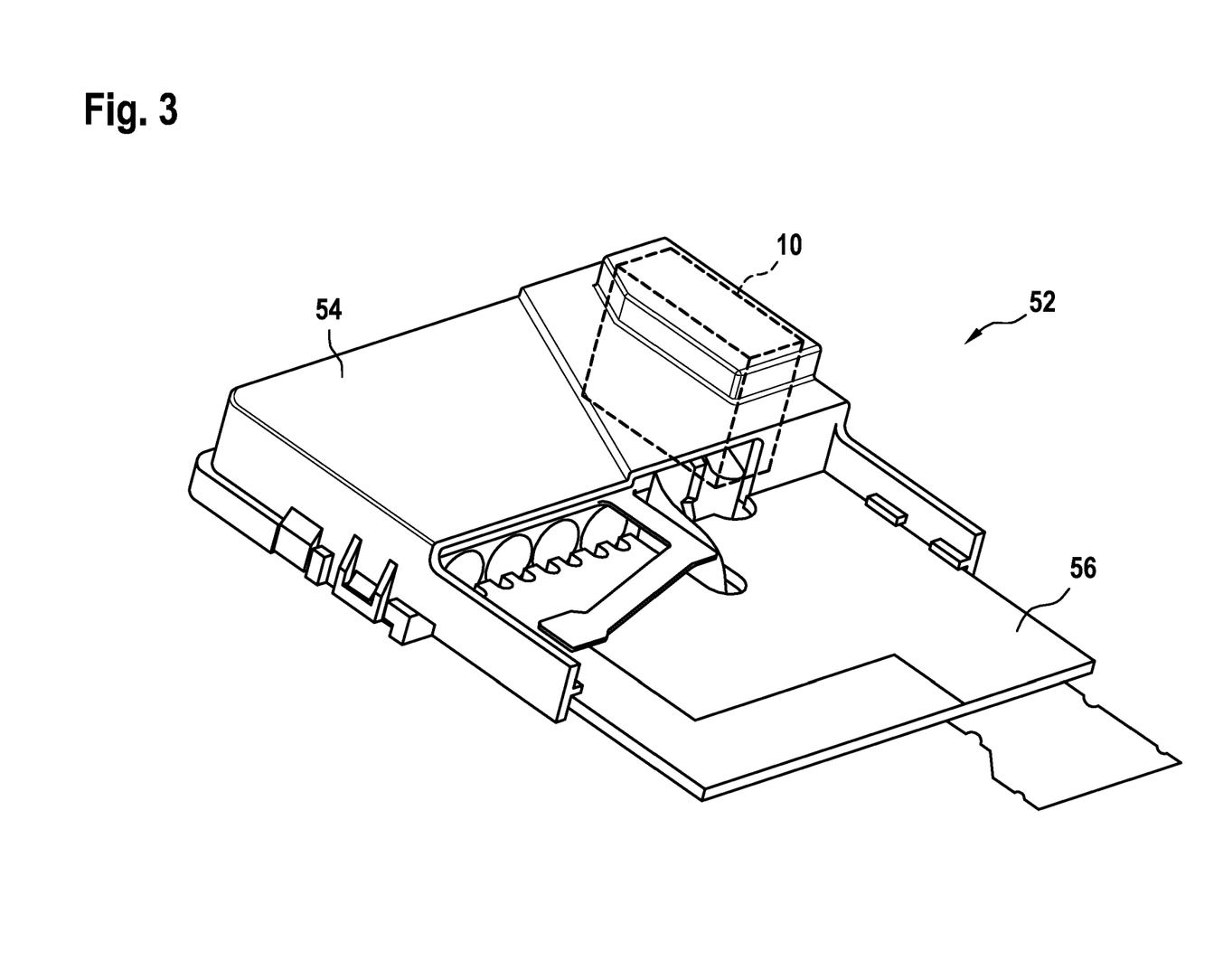
FIG. 3 shows a perspective view of an example laser projector according to the present invention.

FIG. 3 shows a perspective view of a laser projector 52 according to the present invention. Laser projector 52 includes laser projection device 10. Laser projection device 10 is situated inside of a housing 54 of laser projector 52 and is indicated by a region marked in outline by a dashed line. Laser projection device 10 is situated on a main board 56 of laser projector 52.

What is claimed is:

1. A laser projection device, comprising:
    at least one laser diode for generating at least one laser beam;
    at least one laser driver configured to operate the at least one laser diode;
    at least one image processing circuit configured to supply control data for the at least one laser driver;
    at least one central processor and/or driver; and
    at least one control and/or regulating unit which is configured to block the at least one laser driver in response to an occurrence of at least one fault, wherein the at least one control and/or regulating unit includes at least one nonvolatile memory in which at least one minimum set of monitoring functions is stored,
    wherein the at least one control and/or regulating unit includes at least one setpoint value register, and wherein, at a start of operation of the laser projection device, the at least one control and/or regulating unit is configured to copy the at least one minimum set of monitoring functions from the at least one nonvolatile memory to the at least one setpoint value register.

2. The laser projection device as recited in claim 1, wherein the central processor and/or driver have neither write-access, nor read-access to the at least one nonvolatile memory.

3. A laser projection device, comprising:
    at least one laser diode for generating at least one laser beam;
    at least one laser driver configured to operate the at least one laser diode;
    at least one image processing circuit configured to supply control data for the at least one laser driver;
    at least one central processor and/or driver; and
    at least one control and/or regulating unit which is configured to block the at least one laser driver in response to an occurrence of at least one fault, wherein the at least one control and/or regulating unit includes at least one nonvolatile memory in which at least one minimum set of monitoring functions is stored,
    wherein the at least one control and/or regulating unit includes at least one setpoint value register, and wherein, at a start of operation of the laser projection device, the at least one control and/or regulating unit is configured to copy the at least one minimum set of monitoring functions from the at least one nonvolatile memory to the at least one setpoint value register,
    wherein the at least one control and/or regulating unit includes at least one actual value register and at least one laser activation register, and wherein the at least one control and/or regulating unit is configured to set the at least one laser activation register and to simultaneously enable an output of the at least one image processing circuit, if the contents of the at least one actual value register correspond to at least the contents of the at least one setpoint value register.

4. The laser projection device as recited in claim 3, wherein the setting of the at least one laser activation register unlocks the at least one laser driver.

5. The laser projection device as recited in claim 4, wherein the at least one control and/or regulating unit includes at least one protocol register, and in response to the occurrence of at least one fault in at least one of the monitoring functions, and/or if the contents of the at least one actual value register do not correspond to at least the contents of the at least one setpoint value register, the at least one control and/or regulating unit is configured to reset the at least one laser activation register, to simultaneously block the output of the at least one image processing circuit, and to indicate the at least one fault in a bit of the at least one protocol register.

6. The laser projection device as recited in claim 5, wherein the resetting the at least one laser activation register blocks the at least one laser driver.

7. The laser projection device as recited in claim 3, wherein the at least one control and/or regulating unit includes at least one operating mode register, and wherein the at least one control and/or regulating unit is configured to mask the at least one actual value register with contents of the at least one operating mode register.

8. The laser projection device as recited in claim 1, wherein the at least one control and/or regulating unit includes at least one interrupt register, and wherein, in response to an occurrence of at least one event, which corresponds to at least contents of the at least one interrupt register, the at least one control and/or regulating unit is configured to initiate an interrupt and to transmit the interrupt via an interrupt line to the central processor and/or the driver.

9. A method for operating a laser projection device, the laser projection device including at least one laser diode for generating at least one laser beam, at least one laser driver configured to operate the at least one laser diode, at least one image processing circuit configured to supply control data for the at least one laser driver, at least one central processor and/or driver, and at least one control and/or regulating unit which is configured to block the at least one laser driver in response to an occurrence of at least one fault, the method comprising:
    at a start of operation of the laser projection device, copying a minimum set of monitoring functions stored in a nonvolatile memory to at least one setpoint value register,
    wherein the at least one control and/or regulating unit includes at least one actual value register and at least one laser activation register, and wherein the at least one control and/or regulating unit is configured to set the at least one laser activation register and to simultaneously enable an output of the at least one image processing circuit, if the contents of the at least one actual value register correspond to at least the contents of the at least one setpoint value register.

10. A laser projector, comprising:
at least one laser projection device, including:
- at least one laser diode for generating at least one laser beam;
- at least one laser driver configured to operate the at least one laser diode;
- at least one image processing circuit configured to supply control data for the at least one laser driver;
- at least one central processor and/or driver; and
- at least one control and/or regulating unit which is configured to block the at least one laser driver in response to an occurrence of at least one fault, wherein the at least one control and/or regulating unit includes at least one nonvolatile memory in which at least one minimum set of monitoring functions is stored, wherein the at least one control and/or regulating unit includes at least one setpoint value register, and wherein, at a start of operation of the laser projection device, the at least one control and/or regulating unit is configured to copy the at least one minimum set of monitoring functions from the at least one nonvolatile memory to the at least one setpoint value register.

* * * * *